Patented Dec. 27, 1949

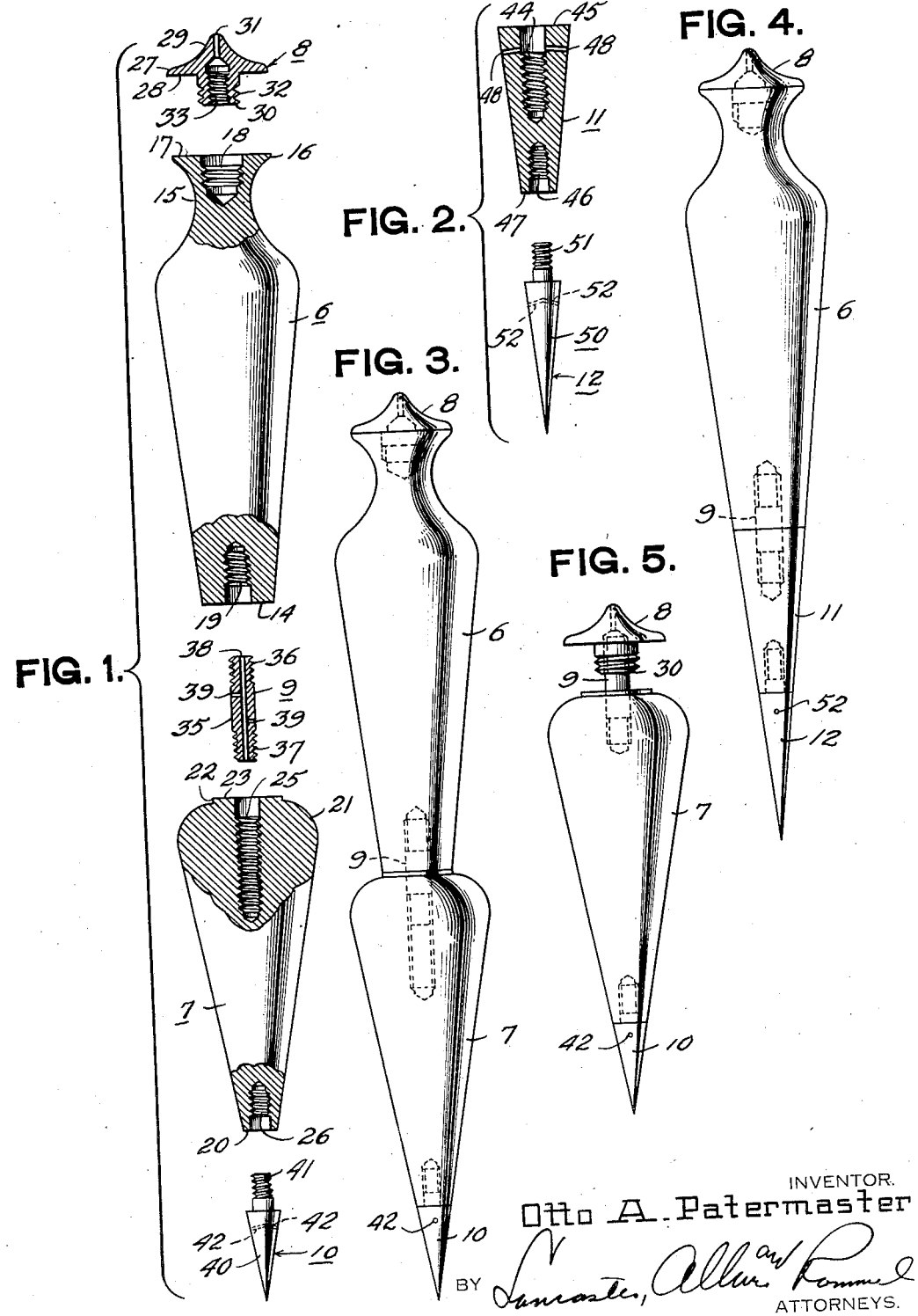

2,492,884

UNITED STATES PATENT OFFICE 2,492,884

PLUMB BOB

Otto A. Patermaster, Gunston Manor, near Lorton, Va.

Application March 6, 1947, Serial No. 732,767

2 Claims. (Cl. 33—216)

This invention relates to plumb bobs, sometimes termed plummets.

In the past it has been proposed to provide plumb bobs which are adjustable as to weight, either by providing a body portion having a cavity for mercury, the weight of the plumb bob being determined by the weight of the solid metal parts, plus the quantity of mercury introduced into the cavity, or by providing a shell-like body portion into which a molded solid load or weight is introduced, several of such solid loads or weights being provided, each cored differently so that they vary in weight. When manufacturing such plumb bobs, it is necessary to determine the maximum gross weight (body portion and insertable load or weight) and make the body portion large enough to receive the maximum insertable load or weight. As a result the body portion presents the same area to wind forces when carrying light and intermediate loads as it does when heavily loaded. This is an objectionable feature of such plumb bobs. Therefore one of the objects of the present invention is to provide a plumb bob which may be adjusted to various weights, by the selection of parts thereof, in a manner to overcome such objectionable feature. In this way the plumb bob may be adjusted as to weight, to meet conditions, such as wind forces which may prevail during use of the plumb bob, and to the space available between a marker and an instrument, such as a transit.

Another object is to provide a plumb bob that, altho of considerable weight, is slender in its over-all characteristics, that is, streamlined, so as to enable a person to observe more conveniently the relative position of the point of the bob with respect to the marker, and to present less surface to the wind, thus tending to prevent swinging of the plumb bob and line, giving a person more rapid results or reducing the time to set the plumb bob over the marker.

A further object is to provide a plumb top comprising a plurality of elongated sections arranged one above another, in connection with which the center of gravity is slightly above the center of the over-all length of the combination, giving less oscillation and less gyration due to the center of gravity and streamlining.

A still further object of the invention is to provide a combination of units which are interchangeable and whereby a selection may be made from such units to provide a plumb bob of the desired weight, or a selection may be made from the units to provide two plumb bobs. The latter is particularly useful for horizontal chaining or measuring where distances require vertical plumbing.

Other objects and advantages of the invention will appear in the following description of the invention, taken in connection with the accompanying drawing, forming a part of this specification, and in which drawing:

Fig. 1 is an exploded view of the units of a plumb bob used in providing a plumb bob of maximum weight, the major units being shown partly in elevation and vertical section, some of the minor units in vertical section and the plumb bob point in elevation.

Fig. 2 is an exploded view of two additional units which may be used with some of the units shown in Fig. 1, to provide a plumb bob of medium weight, one of the units being shown in vertical section and the other in elevation.

Fig. 3 is a side elevational view of the units shown in Fig. 1, assembled.

Fig. 4 is a side elevational view of some of the units shown in Fig. 1, assembled with the units shown in Fig. 2 to provide a plumb bob of medium weight.

Fig. 5 is a side elevational view of some of the units shown in Fig. 1, assembled to provide a plumb bob of light weight.

The set of units for carrying out the principle of my invention comprises a first major body 6; a second major body 7; a cap 8; a dowel 9 which may be used to connect the bodies 6 and 7, as shown in Fig. 3, or to connect the body 7 and cap 8 as shown in Fig. 5; a first point 10 for the lower end of body 7; a minor truncated conical extension body 11 for association with the body 6 and dowel 9; and a second point 12 for association with the extension body 11, the assembly of units 8, 6, 9, 11 and 12 being shown in Fig. 4.

The major body 6 is a comparatively long and slender unit, the major portion of which is tapered in conformity with ordinary practice, truncated at its lower end to provide a lower face 14 in a plane normal to the axis of the unit, and may be provided with a neck portion 15 and a head 16, the latter preferably having an upper face 17 also in a plane normal to the axis of the unit. The body 6 is provided with a first screw threaded axial bore 18 open to its upper face, and a second screw threaded axial bore 19 open to its lower face, the bore 19 preferably being of less diameter than the bore 18.

The major body 7 is also a comparatively long and slender unit, tapered in conformity with ordinary practice, preferably truncated at its lower end to provide a lower face 20 in a plane normal to the axis of the unit. The upper end of the unit may be rounded, as at 21 in a manner similar to an ordinary spinning top and the extreme upper portion is preferably provided with an annular boss 22 presenting a top face 23 in a plane normal to the axis of the unit. The body 7 is provided with a first screw threaded axial bore 25 open to the top face 23, this bore being of the same diameter as bore 19 of body 6. In the example shown the body 7 is also provided with a second screw threaded axial bore 26 open to the lower face 20 for a purpose to be subsequently set forth.

As to the cap 8 it is preferably shaped to provide an intermediate annular body portion 27 having a lower face 28 for engagement with the face 17 of body 6; a preferably upstanding conical tip portion 29 on the body portion 27; and a plug portion 30 depending from body portion 27. The conical tip portion 29 is provided with a vertical way 31 and the plug portion 30 has an external screw thread 32 of a diameter corresponding to the diameter of bore 19, and an internal screw threaded bore 33 of a diameter corresponding to the diameter of bore 19. The way 31 and the inner end of bore 33 are for the reception of the usual cord and knot (not shown in the drawing) of the suspending means for the pumb bob.

The dowel 9 is preferably provided with a cylindrical intermediate portion 35 and externally screw threaded upper and lower end portions 36 and 37, respectively, each of a diameter corresponding to the diameter of bores 19 and 25. The dowel is preferably provided with an axial way 38 and two radial holes 39 at its intermediate portion and at opposite sides of the way 38, to facilitate unscrewing the dowel, by use of a pin, from units of the plumb bob.

Most plumb bobs are made mainly of brass with hardened steel points and for that reason it is preferred to provide the point 10 comprising a body 40 tapered in conformity with the taper of body 7, and a screw threaded stem 41 for insertion in the bore 26 of said body. The body 40 of the point 10 is provided with holes 42 at opposite sides of its axis to facilitate use of a pin when unscrewing the point from body 7. These holes are preferably drilled in body 40 so that their axes are in obtuse angular relation to each other and normal to opposite sides of the body as indicated in Fig. 1.

The minor truncated conical extension body 11 is tapered in conformity with the taper of body 6 and is provided with an upper screw threaded axial bore 44, open to its upper face 45, of a diameter equal to the diameter of bore 19 and a lower screw threaded axial bore 46 open to its lower face 47, the diameter of the bore 46 preferably being smaller than the bore 44. There may be provided holes 48 arranged similarly to the holes 42 to facilitate unscrewing the body 11 from dowel 9.

Again, carrying out the usual practice it is preferred to provide the extension body 11 with a separable point 12, that is, the body 11 may be of brass and the point 12 of hardened steel. With this end in view, the point 12 comprises a body 50, tapered in conformity with the taper of body 11, and a screw threaded stem 51 for insertion in bore 46. The point is also provided with holes 52 in the body 50 arranged as and for the purpose described in connection with holes 42 and 48.

When using the units of the set thus provided, a selection may be made as to the particular conditions encountered. For instance if it is desired to use a heavy plumb bob at an instrument such as a transit, where extreme accuracy is desired, the units 6, 7, 8, 9 and 10 may be assembled, as shown in Fig. 3, and by way of example the total weight of the assembly may be 20 ounces. Thus a slender heavy plumb bob is provided which is streamlined, so to speak, making is unnecessary to constantly stoop, in order to set the point 10 over the mark; the weight is sufficient to avoid too much gyration and oscillation when setting the plumb bob over the mark; and less surface is in the path of wind forces than if a heavy plumb bob of the usual type is used. In this assembly the plug 30 fits snugly in the bore 18, the face 28 of the cap 8 fits flat against the face 17 of body 6; the dowel 9 is concealed in the bores 19 and 25 of the units 6 and 7; and the point 10 forms a slender lower terminal of the assembly. The combination is easily handled and less cumbersome to carry.

If a plumb bob of medium weight is desired such as a 14 ounce plummet by way of example, the units 6, 8, 9, 11 and 12 may be assembled, as shown in Fig. 4. This is particularly useful by a rear chainman since such are not usually as experienced as the head chainman, and can do quicker and better work with a plumb bob that is not too light. I have observed that chainmen who have not had considerable experience, are often nervous and a plumb bob of medium weight enables them to more readily and accurately plumb over the mark. When thus assembled, the face 45 of extension body 11 engages the face 14 of body 6, the dowel 9 connecting these bodies 6 and 11, and the longer point 12 connected to extension 11 presents a shapely, streamlined plumb bob which may be readily set over the mark without stooping.

When a plumb bob, comparatively light in weight, is desired the units 7, 8, 9 and 10 may be assembled as shown in Fig. 5. Such a plumb bob approximately 8 ounces in weight, is very useful by an experienced head chainman who can more readily use a light plummet. Such a plumb bob lightens the load to be carried by the head chainman who usually carries the chain. In this assembly the units 7 and 10 are connected, as previously described and the dowel 9 is used to support the cap 8 by threaded engagement of the threaded end 36 of dowel 9 entered into threaded bore 33. This assembly is also useful at the instrument where inclines are encountered and a plumb shorter than is shown in Figs. 3 and 4 must be used because of limited space available between the instrument and mark.

By the inclusion of two of the dowels 9 in a set, a medium weight plumb bob, as shown in Fig. 4 may be provided, and also a light weight plumb bob may be assembled, like in Fig. 5, omitting the cap 8, and threading the suspending cord thru the axial way 38 of the dowel 9 and accommodating the knot in bore 25 of body 7 as is obvious from an inspection of the drawing. These plumb bobs will be found useful for horizontal chaining, or measuring where distances require vertical plumbing, such as for obtaining measurements in plain surveying where terrain is not level and plumb bobs are essential.

It will be noted from an inspection of Fig. 3 that the center of gravity of the plumb bob is slightly above the center of the over-all length of the assembly, giving less oscillation and less gyration due to this location of the center of gravity and the streamlining of the main units of the assembly.

In defining the invention in the claims reference is made to plumb bob elements as of inverted generally conical shape, that is tapered pointing downwardly in conformity with ordinary practice. However, one of the important features of my invention is to provide a plurality of such conical elements providing major body portions or parts of a major body portion between the plumb bob line connector or cap and the terminal steel point to provide an overall streamlining of the entire length of plumb bob reducing oscillation and gyration as well as affording greater ease in setting the plum bob over a marker.

Other features, objects and advantages of my invention will be apparent in the following claims:

1. A plumb bob comprising an assembly of interchangeable members consisting of a first major solid metal body of long, slender, inverted generally conical shape, truncated at its lower end and provided with a first axial screw threaded bore open at its upper end, and a second axial screw threaded bore open at its lower end, the first bore being of greater diameter than said second bore; a second major solid metal body of long, slender inverted generally conical shape, provided with an axial screw threaded bore of the same diameter as said second bore open at its upper end; a dowel provided with screw threaded end portions in threaded engagement with the second bore of the first body and the bore of said second body connecting them in axial alignment; a lower terminal steel point for connection with the lower end of the second major body and a suspending cord cap provided with an externally screw threaded plug in threaded engagement with said first bore, said plug provided with an internal screw threaded bore of a diameter equal to the diameter of the bore and in-screw threaded end portion of said dowel and interchangeable with said first body for mounting on said dowel to provide a plumb bob of lighter weight.

2. A plumb bob comprising an assembly of interchangeable members consisting of a first major solid metal body of long, slender, inverted generally conical shape, truncated at its lower end and provided with a first axial screw threaded bore open at its upper end, and a second axial screw threaded bore open at its lower end, the first bore being of greater diameter than said second bore; a second major solid metal body of long, slender inverted generally conical shape, provided with an axial screw threaded bore of the same diameter as said second bore open at its upper end; a dowel provided with screw threaded end portions in threaded engagement with the second bore of the first body and the bore of said second body connecting them in axial alignment, said dowel provided with an axial way for a suspending cord; a lower terminal steel point for connection with the lower end of the second major body and a cap including an externally screw threaded plug in screw threaded engagement with said first bore, said plug provided with an internal screw threaded bore of a diameter equal to the diameter of the screw threaded end portion of said dowel and a vertical axial way open to the top and bore of said cap for accommodation of the suspending cord and knot of the plumb bob, said cap interchangeable with said first body for mounting on said dowel to provide a plum bob of lighter weight.

OTTO A. PATERMASTER.

REFERENCES CITED

The following references are of record in the file of this patent:

UNITED STATES PATENTS

| Number | Name | Date |
|---|---|---|
| 1,110,897 | Comstock | Sept. 15, 1914 |
| 1,336,289 | Fagrie | Apr. 6, 1920 |
| 1,590,410 | Bernard | June 29, 1926 |
| 1,596,882 | Langsner | Aug. 24, 1926 |